United States Patent
Black et al.

(10) Patent No.: US 9,935,660 B2
(45) Date of Patent: Apr. 3, 2018

(54) MULTIPLEX ANTENNA MATCHING CIRCUIT, WIRELESS COMMUNICATION DEVICE, AND METHOD FOR COUPLING MULTIPLE SIGNAL PORTS TO AN ANTENNA VIA CASCADED DIPLEXERS

(71) Applicant: Motorola Mobility LLC, Chicago, IL (US)

(72) Inventors: Gregory R Black, Vernon Hills, IL (US); Prem K Ganeshan, Arlington Heights, IL (US); Umesh D Navsariwala, Bartlett, IL (US)

(73) Assignee: Motorola Mobility LLC, Chicago, IL (US)

( * ) Notice: Subject to any disclaimer, the term of this patent is extended or adjusted under 35 U.S.C. 154(b) by 103 days.

(21) Appl. No.: 15/049,193

(22) Filed: Feb. 22, 2016

(65) Prior Publication Data
US 2017/0244430 A1    Aug. 24, 2017

(51) Int. Cl.
*H01Q 3/00* (2006.01)
*H04L 5/00* (2006.01)
*H04B 1/00* (2006.01)

(52) U.S. Cl.
CPC ............ *H04B 1/0057* (2013.01); *H04L 5/001* (2013.01)

(58) Field of Classification Search
CPC . H04J 3/04; H04J 1/08; H04W 40/00; H04W 88/02; H04B 7/04; H04L 5/00; H01Q 3/00
See application file for complete search history.

(56) References Cited

U.S. PATENT DOCUMENTS

| | | | |
|---|---|---|---|
| 7,656,909 B1 * | 2/2010 | Sternowski | H04J 1/08 370/535 |
| 9,774,098 B2 * | 9/2017 | Jidhage | H01Q 21/30 |
| 2004/0233860 A1 * | 11/2004 | Campbell | H04N 7/106 370/297 |
| 2005/0219010 A1 * | 10/2005 | Erb | H04B 1/0458 333/126 |
| 2012/0087284 A1 * | 4/2012 | Linehan | H01Q 1/246 370/297 |
| 2014/0035700 A1 * | 2/2014 | Zeng | H03H 7/01 333/132 |
| 2014/0227982 A1 * | 8/2014 | Granger-Jones | H04B 7/0404 455/77 |
| 2015/0131498 A1 * | 5/2015 | Rana | H04L 5/08 370/297 |
| 2016/0119003 A1 * | 4/2016 | Granger-Jones | H04B 1/006 370/276 |

* cited by examiner

*Primary Examiner* — Mohamed Kamara
(74) *Attorney, Agent, or Firm* — Watson Intellectual Property Group

(57) ABSTRACT

The present application provides a multiplex antenna matching circuit and method for coupling multiple signal ports to an antenna via cascaded diplexers. The multiplex antenna includes a diplexer for coupling a single merged port associated with an antenna with two separated signal nodes. The multiplex antenna further including at least one cascaded sub-diplexer. Each cascaded sub-diplexer is associated with a respective one of the two separated signal nodes, where the cascaded sub-diplexer further couples the respective one of the two separated signal nodes with a respective two further separated signal ports.

20 Claims, 5 Drawing Sheets

MULTIPLEX ANTENNA MATCHING CIRCUIT, WIRELESS COMMUNICATION DEVICE, AND METHOD FOR COUPLING MULTIPLE SIGNAL PORTS TO AN ANTENNA VIA CASCADED DIPLEXERS

FIELD OF THE APPLICATION

The present disclosure relates generally to multiplexing multiple signals with a single antenna, and more particularly, to the multiplexing of multiple signals using multiple cascaded stages of diplexers.

BACKGROUND

Wireless communication devices are continuously integrating new and enhanced features and capabilities, that leverage an ability to remotely transmit and receive data using wireless communication capabilities. As the features and capabilities are added and/or enhanced, there often is a need to communicate wirelessly an ever increasing amount of information/data in order to support the added and/or enhanced features and capabilities of the device. However, increasing a device's ability to communicate information/data wirelessly is complicated by a further desire to limit the overall size of the device, which can sometimes make desirable an ability to share some of the circuitry and structure, which is used to support various forms of wireless communications.

Diplexers can facilitate the sharing of resources by allowing multiple separate signals to be merged onto a single terminal through frequency domain multiplexing. For example, a diplexer can help facilitate a pair of ports each respectively associated with its own transceiver being coupled to a common shared port that can be associated with a single antenna. Diplexer are generally different than a combiner or splitter in that each of the ports to be merged are often frequency selective, which can also serve to allow multiple separate signals to be merged while helping to reduce the potential for interference between the signals being merged.

Some forms of wireless cellular communications, in order to increase the rate of data that can be communicated, will allow a larger amount of frequency bandwidth to be utilized in support of the communication through carrier aggregation, which can sometimes make use of non-contiguous frequency bands. The increase in available bandwidth for supporting a particular communication will often allow for a corresponding increase in bitrate.

Conventionally, bands having carrier frequencies below about 800 MHz are referred to as ultralow bands. Bands between 800 MHz and 1500 MHz are often referred to as low bands. Bands between 1500 MHz and 2200 MHz are often referred to as mid bands, and bands greater than 2200 MHz are often referred to as high bands. Previously, cellular service providers have supported a number of two-downlink carrier aggregation band combinations, including simultaneous ultralow band or low band operation with mid band or high band operation. Tunable antenna matching with diplexing functionality including diplexers having a split at about 1500 MHz, have been used to support at least some of these forms of carrier aggregation. However, cellular service providers are wanting to support an even greater variety of two cellular band carrier aggregation, as well as an aggregation of an even greater number of bands.

The present innovators have correspondingly recognized that tunable matching circuits with triplexing, quadruplexing and potentially even higher degrees of multiplexing functionality can be used to support a greater variety of carrier aggregation. This can also allow multiple types of wireless communication to be merged for use with a single antenna, such as the transmission and/or receipt of wireless signals in support of cellular communications, as well as the transmission and/or receipt of wireless signals in support of other forms of wireless communication including a global positioning system, as well as various WiFi type communication systems. The innovators have further recognized that the triplexing, quadruplexing and/or multiplexing functionality in a tunable matching circuit can be provided by using one or more sets of cascaded diplexers.

SUMMARY

The present application provides a multiplex antenna matching circuit. The multiplex antenna matching circuit includes a diplexer for coupling a single merged port associated with an antenna with two separated signal nodes. The multiplex antenna matching circuit further includes at least one cascaded sub-diplexer. Each cascaded sub-diplexer is associated with a respective one of the two separated signal nodes, where the cascaded sub-diplexer further couples the respective one of the two separated signal nodes with a respective two further separated signal ports.

In at least one embodiment, each of the further separated signal ports and any separated signal node, which is not associated with one of the cascaded sub-diplexers is coupled to a respective transceiver.

The present application further provides a method for coupling multiple signal ports to an antenna. The method includes coupling, via a diplexer, a single merged port associated with the antenna with two separated signal nodes. The method further includes coupling, via each one of at least one cascaded sub-diplexer, a respective one of the two separated signal nodes with a respective two further separated signal ports.

The present invention still further provides a wireless communication device. The wireless communication device includes an antenna, and a diplexer for coupling a single merged port associated with the antenna with two separated signal nodes. The wireless communication device further includes at least one cascaded sub-diplexer. Each cascaded sub-diplexer is associated with a respective one of the of the two separated signal nodes, where the cascaded sub-diplexer further couples the respective one of the two separated signal nodes with two further separated signal ports. The wireless communication device still further includes a plurality of transceivers including a respective transceiver associated with each of the two further separated signal ports, and any of the two separated signal nodes that are not associated with the at least one cascaded sub-diplexer.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
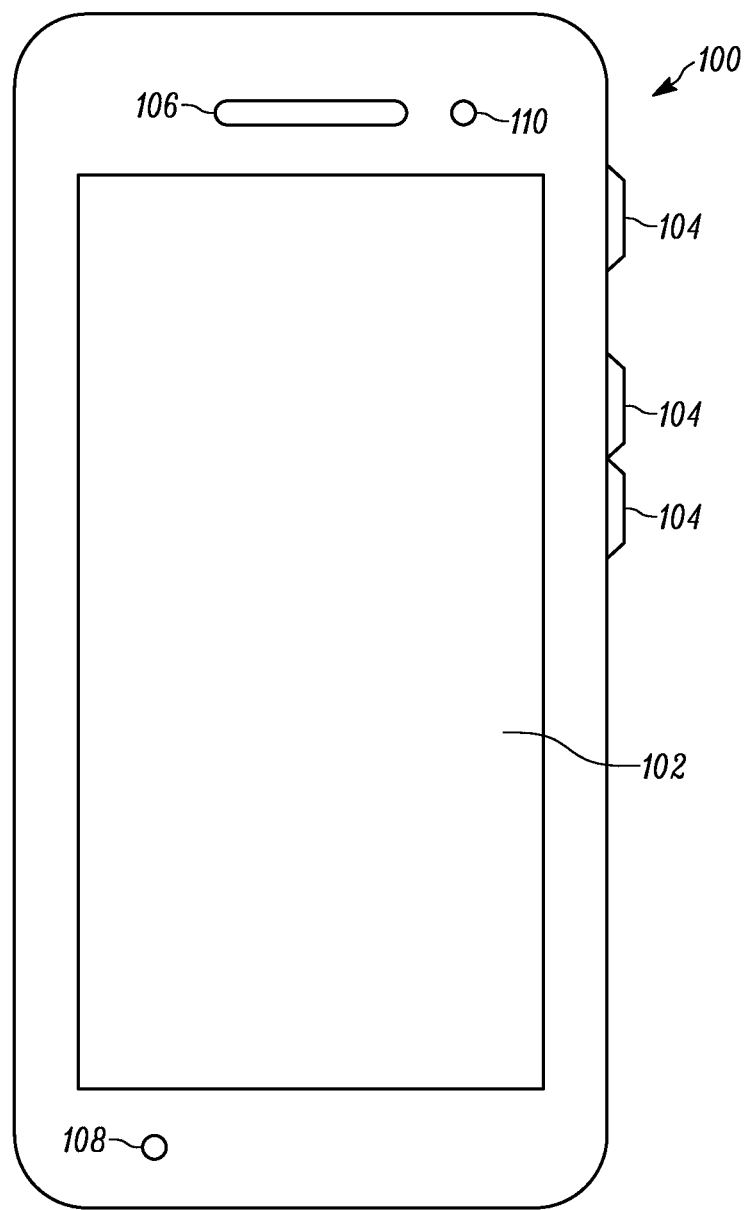
FIG. 1 is a front view of an exemplary wireless communication device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a front view of an exemplary wireless communication device 100, such as a wireless communication device. While in the illustrated embodiment, the type of wireless communication device shown is a radio frequency cellular telephone, other types of devices that include wireless radio frequency communication capabilities are also relevant to the present application. In other words, the present application is generally applicable to wireless communication devices beyond the type being specifically shown. A couple of additional examples of suitable wireless communication devices that may additionally be relevant to the present application in the incorporation and management of a multiplex antenna matching circuit can include a tablet, a laptop computer, a desktop computer, a netbook, a cordless telephone, a selective call receiver, a gaming device, a personal digital assistant, as well as any other form of wireless communication device that might be used to manage multiband communications and/or wireless communications involving one or more different communication standards. A few examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Wi-Fi (IEEE 802.11), as well as various other communication standards. In addition, the wireless communication device 100 may utilize a number of additional various forms of communication including carrier aggregation and simultaneous voice and data that concurrently enables the use of simultaneous signal propagation.

In the illustrated embodiment, the radio frequency cellular telephone includes a display 102 which covers a large portion of the front facing. In at least some instances, the display can incorporate a touch sensitive matrix, that can help facilitate the detection of one or more user inputs relative to at least some portions of the display, including an interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for a simulated actuation. In addition to one or more virtual user actuatable buttons or keys, the device 100 can include one or more physical user actuatable buttons 104. In the particular embodiment illustrated, the device has three such buttons located along the right side of the device.

The exemplary hand held electronic device, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker may also include the capability to also produce a vibratory effect. However, in some instances, the purposeful production of vibrational effects may be associated with a separate element, not shown, which is internal to the device. Generally, the speaker is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110. The wireless communication device will also generally include one or more radio frequency transceivers, as well as associated transmit and receive circuitry, including one or more antennas that may be positioned internally relative to the device.

Figure 2:
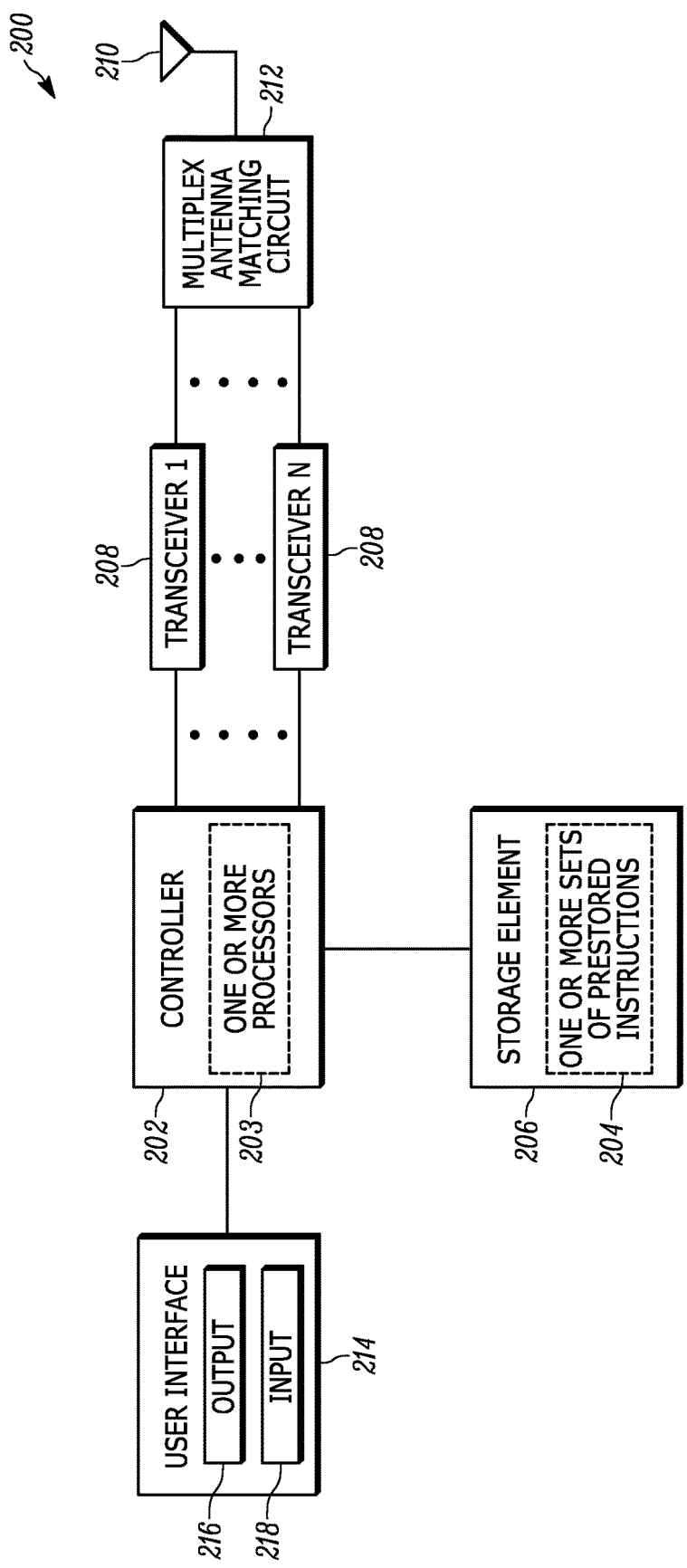
FIG. 2 is a block diagram of a wireless communication device.

FIG. 2 illustrates a block diagram 200 of a wireless communication device 100, in accordance with at least one embodiment. In the illustrated embodiment, the wireless communication device 100 includes a controller 202, which is adapted for managing at least some of the operation of the device 100. In some embodiments, the controller 202 could be implemented in the form of one or more processors 203, which are adapted to execute one or more sets of pre-stored instructions 204, which may be used to form or implement the operation of at least part of one or more controller modules including those used to manage wireless communication. The one or more sets of pre-stored instructions 204 may be stored in a storage element 206, which while shown as being separate from and coupled to the controller 202, may additionally or alternatively include some data storage capability for storing at least some of the prestored instructions for use with the controller 202, that are integrated as part of the controller 202.

The storage element 206 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory stick. One skilled in the art will still further appreciate that still other further forms of storage elements could be used without departing from the teachings of the present disclosure. In the same or other instances, the controller 202 may additionally or alternatively incorporate state machines and/or logic circuitry, which can be used to implement at least partially, some of the modules and/or functionality associated with the controller 202.

In the illustrated embodiment, the device further includes one or more transceivers 208, which are coupled to the controller 202 and which serve to manage the external communication of data including their wireless communication using one or more forms of communications. In such an instance, the transceivers will generally be coupled to an antenna 210 via which the wireless communication signals will be radiated and received. For example, the one or more transceivers 208 might include a receiver for supporting communications with a global positioning system, one or more transceivers for supporting cellular radio frequency communications, a transceiver for supporting Bluetooth® type communications, as well as a transceiver for supporting Wi-Fi® type communications. Transceivers for other forms of communication are additionally and/or alternatively possible. While in some instances each transceiver can be associated with a separate antenna, it is envisioned that in the present instance an antenna may be able to support multiple transceivers and/or multiple forms of communication. In the present instance, the one or more transceivers 208 are coupled to an antenna 210 via a multiplex antenna matching circuit 212, which can help to facilitate the multiple transceivers 208 simultaneously interacting with a common antenna 210. While a single antenna is illustrated as interacting with multiple transceivers, it is possible that some of the one or more transceivers could be associated with its own or a different antenna. In other word, the present embodiment does not preclude some transceivers from operating with alternative additional antennas, but the multiplex antenna matching circuit 212 can help to assist multiple transceivers 208 in their separate and/or simultaneous operation with a single common antenna 210.

More specifically, the multiplex antenna matching circuit 212 is intended to allow multiple ports, in this case each generally being associated with respective transceivers, to be merged with a single shared port, which in the present instance is coupled to an antenna. The multiplex antenna matching circuit 212 can further serve to help associate various disparate sets of frequencies with each of the multiple ports to be merged, such that the transceivers can simultaneously operate while reducing the risk that signals associated with a particular transceiver will negatively impact signals intended for use with another transceiver. The multiplex antenna matching circuit 212 can further help the transceivers to better match the impedance of the antenna, so as to more effectively assist in the transfer of power associated with a desired signal between a particular transceiver and the antenna.

In the illustrated embodiment, the device 100 can additionally include user interface circuitry 214, some of which can be associated with producing an output 216 to be perceived by the user, and some of which can be associated with detecting an input 218 from the user. For example, the user interface circuitry 214 can include a display 102 adapted for producing a visually perceptible output, which may further support a touch sensitive array for receiving an input from the user. The user interface circuitry may also include a speaker 106 for producing an audio output, and a microphone 108 for receiving an audio input. The user interface output 216 could further include a vibrational element. The user interface input 218 could further include one or more user actuatable switches 104, one or more sensors, as well as one or more cameras 110. Still further alternative and additional forms of user interface elements may be possible.

Figure 3:
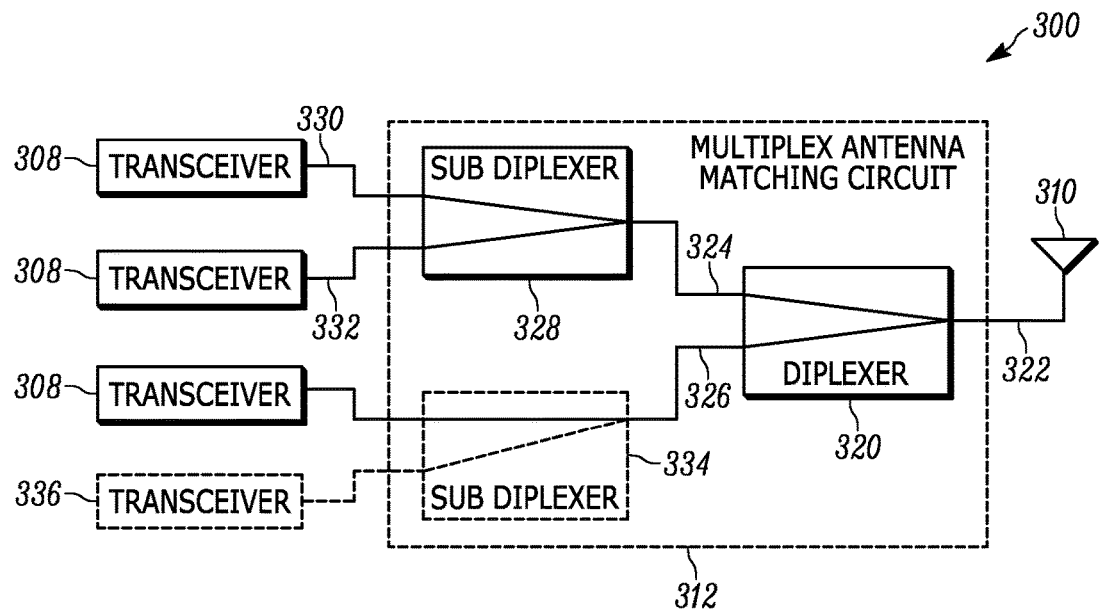
FIG. 3 is a block diagram of circuitry in support of wireless radio frequency communications in a wireless communication device.

FIG. 3 illustrates a block diagram 300 of circuitry in support of wireless radio frequency communications in a wireless communication device. In the illustrated embodiment, the circuitry includes three transceivers 308, each of which is coupled to the multiplex antenna matching circuit 312, and an antenna 310, which is similarly coupled to the multiplex antenna matching circuit 312. More specifically, the multiplex antenna matching circuit 312 merges the multiple ports associated with each of the transceivers 308 with the port associated with the antenna 310.

The multiplex antenna matching circuit 312 has a set of cascaded diplexers, including a diplexer 320 for coupling a single merged port 322 associated with an antenna 310 with two separated signal nodes 324 and 326. The multiplex antenna matching circuit 312 additionally includes at least one cascaded sub-diplexer 328. Each cascaded sub-diplexer 328 is associated with a respective one 324 of the two separated signal nodes 324 and 326, where the cascaded sub-diplexer 328 further couples the respective one 324 of the two separated signal nodes with two further separated signal ports 330 and 332. Each of the further separated signal ports 330 and 332, and any separated signal node 326, which is not associated with one of the cascaded sub-diplexers 328, is coupled to a respective transceiver 308. While the use of a single sub-diplexer 328 cascaded with a single diplexer 320 is illustrated and discussed to accommodate a multiplex antenna matching circuit 312 that can couple three transceivers 308 to an antenna 310, a second sub-diplexer 334, shown in dashed lines, could be used to extend the multiplex antenna matching circuit 312 to accommodate a still further transceiver 336.

Figure 4:
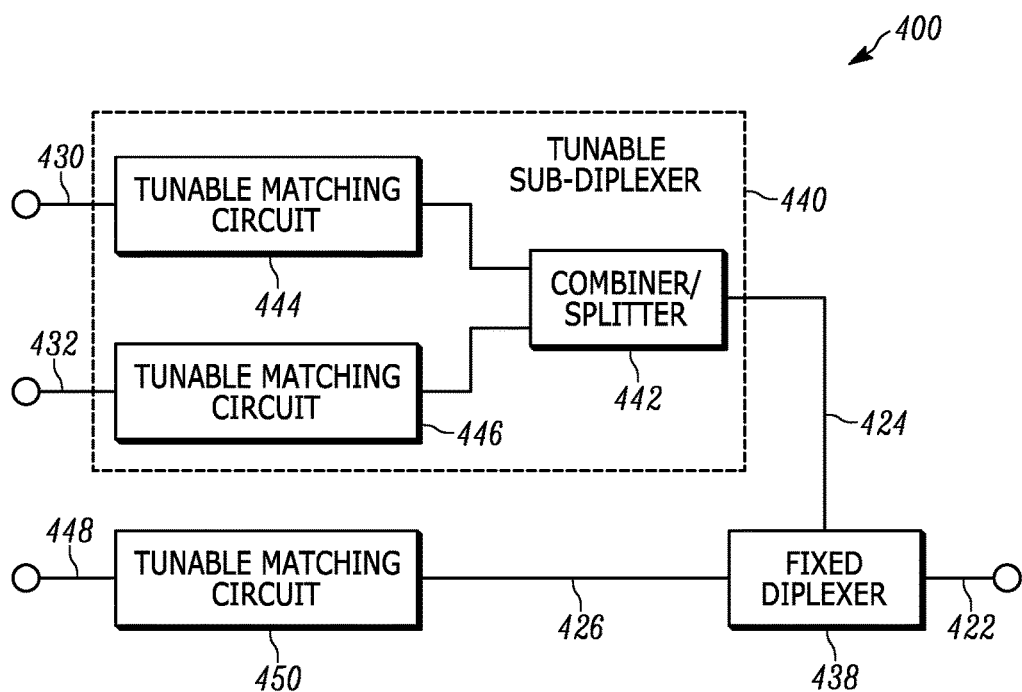
FIG. 4 is a block diagram of an exemplary multiplex antenna matching circuit.

FIG. 4 illustrates a block diagram 400 of an exemplary multiplex antenna matching circuit 312. In the illustrated embodiment, the multiplex antenna matching circuit includes a fixed diplexer 438, and a cascaded tunable sub-diplexer 440. The tunable sub-diplexer 440 includes a combiner/splitter 442, which facilitates the coupling of two further separated signal ports 430 and 432 with one 424 of the two separated signal nodes 424 and 426 of the fixed diplexer 438. In the illustrated embodiment, each of the two further separated signal ports 430 and 432 are coupled to the combiner/splitter 442 via a corresponding tunable matching circuit 444 and 446. The separated signal node 426, which is not associated with a cascaded tunable sub-diplexer 440 is coupled to a port 448 via a further tunable matching circuit 450. Each tunable matching circuit 444, 446 and 450 helps to isolate a particular frequency range of interest relative to the signals present at the single merged port 422.

Figure 5:
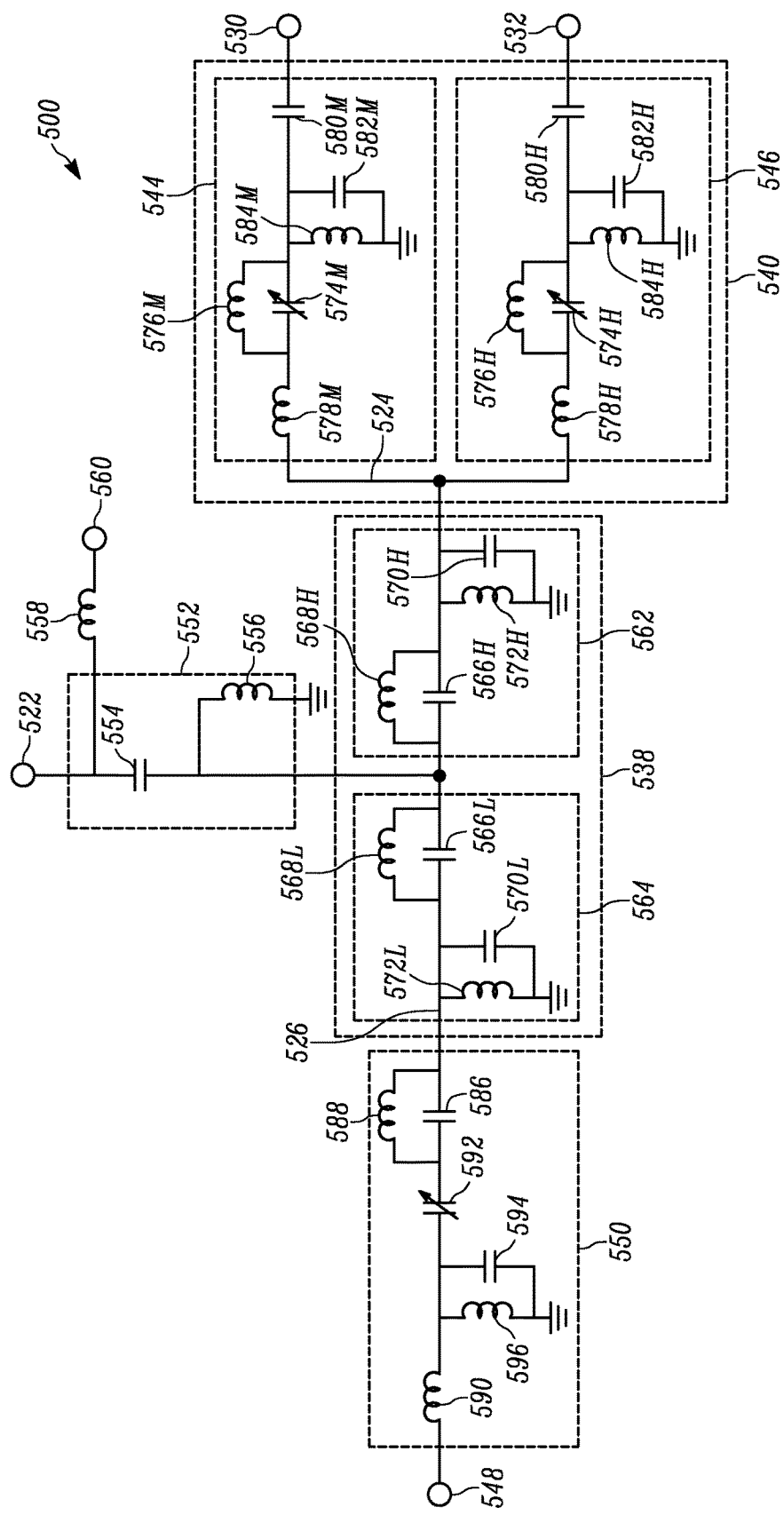
FIG. 5 is a more detailed circuit schematic of the exemplary multiplex antenna matching circuit, illustrated in FIG. 4.

FIG. 5 illustrates a more detailed circuit schematic 500 of the exemplary multiplex antenna matching circuit, illustrated in FIG. 4. The more detailed exemplary multiplex antenna matching circuit includes a fixed diplexer 538 and a cascaded tunable sub-diplexer 540. The fixed diplexer 538 is adapted for coupling a single merged port 522 with two separated signal nodes 524 and 526. The fixed diplexer in the illustrated embodiment is coupled to the single merged port 522 via an impedance matching circuit 552. The impedance matching circuit 552 includes a series capacitor 554 via which the single merged port 522 is coupled to the fixed diplexer 538. The impedance matching circuit 552 further includes on the diplexer side of series capacitor 554 an inductor 556 through which the diplexer side of the series capacitor is coupled to ground. A further inductor 558 couples the single merged port side of the series capacitor 554 to a cap sense terminal 560 which enables sensing of capacitive loading of the antenna connected to port 522. The impedance matching circuit 552 helps to match the impedance of an antenna coupled to the single merged port 522 with the rest of the multiplex antenna matching circuit.

The fixed diplexer includes respective band pass filters 562 and 564 via which the single merged port 522 is coupled to each of the two separated signal nodes 524 and 526. Each of the respective band pass filters 562 and 564 include a series band reject circuit including a parallel combination of a capacitor 566 and an inductor 568, which together couple the single merged port 522 to a respective one of the two separated signal nodes 524 and 526 through a series coupling. Each of the respective band pass filters 562 and 564 additionally include a shunt band pass circuit including a parallel combination of a capacitor 570 and inductor 572, which together couple a respective one of the two separated signal nodes 524 and 526 to ground. Dependent upon the values selected for each of the capacitors and inductors forming the band reject circuits and the band pass circuits, which in turn form each of the band pass filters, a different set of frequencies will be allowed to pass between the single merged port 522 and each of the two separated signal nodes 524 and 526. In at least one embodiment, one of the band pass filters 562 is intended to allow a higher band of signals to pass, and the other one of the band pass filters 564 is intended to allow a lower band of signals to pass. In at least one instance, the higher band of signals includes those frequencies greater than 1500 MHz, and the lower band of signals includes those frequencies less than 1500 MHz.

In the illustrated embodiment, a tunable sub-diplexer 540 is coupled to the separated signal node 524, which is intended to pass a higher band of signals. The tunable sub-diplexer 540 couples a respective one of the separated signal nodes 524 to two further separated signal ports 530 and 532 via respective tunable matching circuits 544 and 546, which each include a tunable band pass filter. Each of the respective tunable band pass filters include a series band reject circuit including a parallel combination of a tunable capacitor 574 and an inductor 576, which together couple the separated signal node 524 to a respective one of the two further separated signal ports 530 and 532 through a series coupling with an additional series inductor 578 and series capacitor 580. Each of the respective tunable band pass filters additionally include a shunt band pass circuit including a parallel combination of a capacitor 582 and an inductor 584, which together couple a respective one of the two further separated signal ports 530 and 532 to ground through the series capacitor 580. The tunable capacitor 574 can be implemented using one or more of various technologies including devices based upon Micro-Electro-Mechanical Systems (MEMS), Barium Strontium Titanate (BST), and solid state FET switches built on insulated CMOS wafers (SOI/SOS). In at least one embodiment, tunable capacitors of the type including Barium Strontium Titanate (BST) are used, which allows the capacitance to vary through the application of a voltage to the device.

Dependent upon the values selected for each of the capacitors and inductors forming the band reject circuits and the band pass circuits which are part of the band pass filters included as part of the tunable matching circuits 544 and 546 of the cascaded sub-diplexer 540, a different set of frequencies will be allowed to pass between the separated signal node 524, and the two further separated signal ports 530 and 532. In at least one embodiment, one of the tunable matching circuits 544 is intended to allow a selectable mid band range of signals to pass, and the other one of the tunable matching circuits 532 is intended to allow a selectable high band range of signals to pass. The particular value of the tunable capacitors may be controlled by one of the processors and/or one of the transceivers.

In the illustrated embodiment, a tunable matching circuit 550 is coupled to the separated signal node 526, which is intended to pass a lower band of signals. The tunable matching circuit 550 includes a parallel combination of a capacitor 586 and an inductor 588, which together couple the separated signal node 526 to a port 548 through a series coupling with an additional series inductor 590 and a tunable series capacitor 592. The tunable matching circuit 550 further includes a parallel combination of a capacitor 594 and an inductor 596, which together couple port 548 to ground through the series inductor 590. The tunable matching circuit 550 is intended to pass a selectable low or ultra low band range of signals to pass, which is dependent upon the particular value selected for the tunable capacitor 592. In at least one embodiment, a tunable capacitor of the type including Barium Strontium Titanate (BST) is used.

The inductor and capacitor values of the multiplex antenna matching circuit 500 are designed to transform the impedance of the antenna 310 to the impedance of the transceivers 308. More specifically, the design is such that the impedance at separated signal ports 548, 530, 532 is more closely equal to the transceiver reference impedance, typically 50 Ohms, and the impedance at the single merged port 522 is more closely equal to the complex conjugate of the antenna 310 impedance, which is the impedance needed to maximize the transfer of power into and out of the antenna 310. The instantaneous bandwidth within which the impedance can be transformed to the transceiver reference impedance depends on the mismatch between the antenna impedance and the transceiver reference impedance. For small antennas, the mismatch tends to be large, resulting in low instantaneous antenna bandwidth. The tunable capacitors 574, 592 are employed to adjust the matching circuit thereby enabling the antenna to be matched over a range of frequency bands greater than the instantaneous bandwidth.

In this way various combinations of low/ultralow with mid and high band signals can be used together with a shared antenna. Various filtering present in the diplexers and cascaded sub-diplexers including tunable matching circuits enables signals associated with any one of the ports 530, 532 and 548 to have a reduced effect on the other ports. While the present disclosure describes the use of a single cascaded sub-diplexer, it is envisioned that further cascaded sub-diplexers could be used to support the merging of still further additional ports including the possibility that further cascaded layers could be used to expand even further the degree of multiplexing provided through the arrangement of various diplexers. This will allow the simultaneous use with a particular shared antenna of multiple bands of frequencies as part of a carrier aggregation, as well as the possibility that the same narrowband antenna could also be used with other types of wireless communication, such as GPS, Wi-Fi, and potentially other types of communications with the particular bands of interest being at least somewhat selectable.

Figure 6:
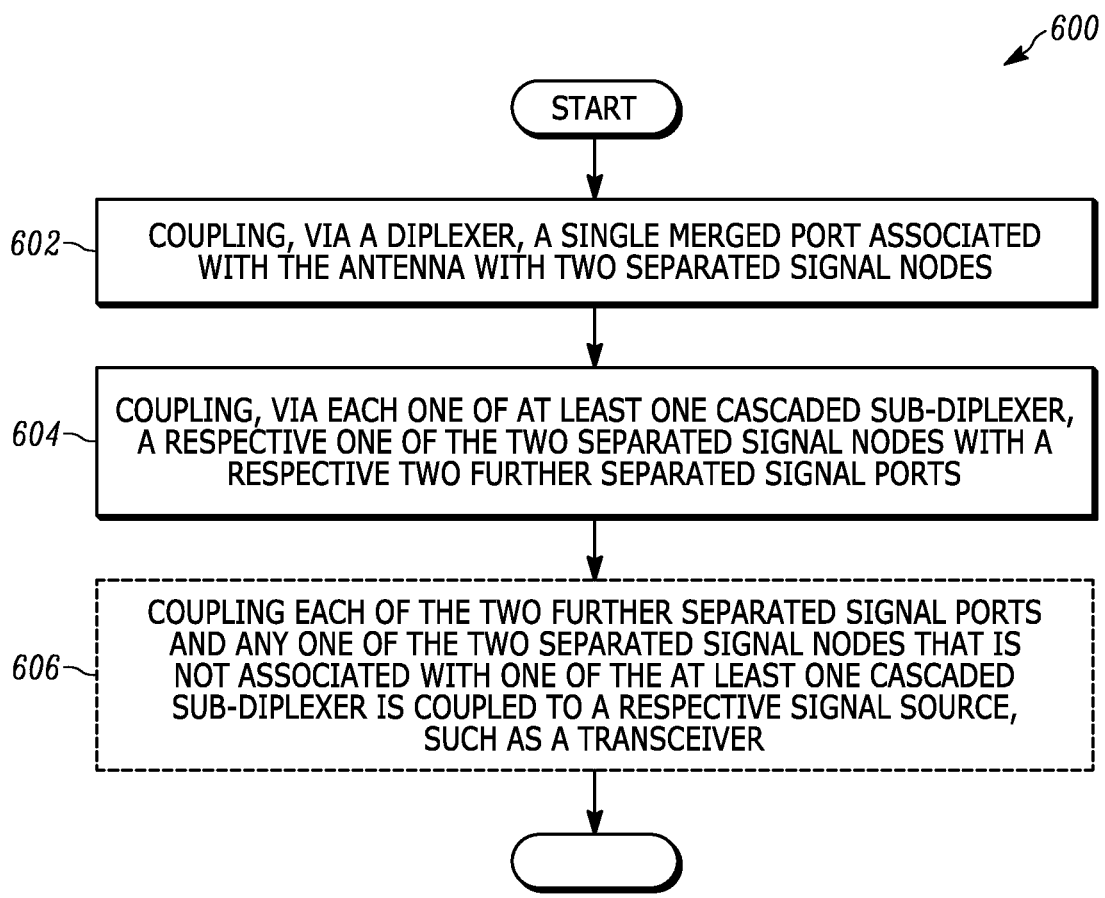
FIG. 6 is a flow diagram of a method for coupling multiple signal ports to an antenna.

FIG. 6 illustrates a flow diagram 600 of a method for coupling multiple signal ports to an antenna. The method includes coupling 602, via a diplexer, a single merged port associated with the antenna with two separated signal nodes. The method further includes coupling 604, via each one of at least one cascaded sub-diplexer, a respective one of the two separated signal nodes with a respective two further separated signal ports. In some instances, the method further provides for coupling 606 each of the two further separated signal ports and any one of the two separated signal nodes that is not associated with one of the at least one cascaded sub-diplexer to a respective signal source, such as a transceiver.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A multiplex antenna matching circuit comprising:
   a diplexer for coupling a single merged port associated with an antenna with two separated signal nodes, wherein the diplexer couples the single merged port to each of the respective separated signal nodes via a band pass filter, where the separated signal nodes include a higher signal node coupled to the single merged port via a band pass filter which is tuned for passing higher band signals, and where the separated signal nodes include a lower signal node coupled to the single merged port via a band pass filter which is tuned for passing lower band signals; and
   at least one cascaded sub-diplexer, each cascaded sub-diplexer associated with a respective one of the two separated signal nodes, where the cascaded sub-diplexer further couples the respective one of the two separated signal nodes with a respective two further separated signal ports.

2. A multiplex antenna matching circuit in accordance with claim 1, wherein the two separated signal nodes include a higher signal node and a lower signal node.

3. A multiplex antenna matching circuit in accordance with claim 2, wherein the lower signal node is a lower band signal port.

4. A multiplex antenna matching circuit in accordance with claim 1, wherein the band pass filter which is tuned for passing higher band signals, and the band pass filter which is tuned for passing lower band signals have their frequencies selected so as to pass signals in each of the higher band and lower band to support carrier aggregation including both a lower signal band component and a higher signal band component.

5. A multiplex antenna matching circuit in accordance with claim 1, wherein each of the band pass filter which are alternatively tuned for passing higher band signals and for passing lower band signals each include a band reject circuit and a band pass circuit.

6. A multiplex antenna matching circuit in accordance with claim 1, wherein the two further separated signal ports include a mid band signal port and a high band signal port.

7. A multiplex antenna matching circuit comprising:
   a diplexer for coupling a single merged port associated with an antenna with two separated signal nodes; and
   at least one cascaded sub-diplexer, each cascaded sub-diplexer associated with a respective one of the two separated signal nodes, where the cascaded sub-diplexer further couples the respective one of the two separated signal nodes with a respective two further separated signal ports, wherein one of the at least one cascaded sub-diplexer couples one of the two separated signal nodes to two further separated signal ports via a band pass filter, where the two further separated signal ports include a mid band signal port coupled to the one of the two separated signal nodes via a band pass filter which is tuned for passing mid band signals, and where the two further separated signal ports include a high band signal port coupled to the one of the two separated signal nodes via a band pass filter which is tuned for passing high band signals.

8. A multiplex antenna matching circuit in accordance with claim 7, wherein the band pass filter which is tuned for passing mid band signals, and the band pass filter which is tuned for passing high band signals have their frequencies selected so as to pass signals in each of the mid band and high band to support carrier aggregation including both a mid signal band component and a high signal band component.

9. A multiplex antenna matching circuit in accordance with claim 8, wherein only one of the two separated signal nodes is associated with a cascaded sub-diplexer, and the separated signal node that is not associated with a cascaded sub-diplexer is a lower band signal port, which is coupled to the single merged port via a band pass filter that is tuned for passing lower band signals, wherein the band pass filter that is tuned for passing lower band signals has its frequency selected so as to pass signals in the lower band in conjunction with the signals being passed in each of the mid band and the high band for supporting carrier aggregation including at least two of a lower signal band component, the mid signal band component, and the high signal band component.

10. A multiplex antenna matching circuit in accordance with claim 1, wherein the two further separated signal ports include a global positioning system signal port and a higher band signal port.

11. A multiplex antenna matching circuit in accordance with claim 1, wherein each of the further separated signal ports and any separated signal node, which is not associated with one of the cascaded sub-diplexers, is coupled to a respective transceiver.

12. A multiplex antenna matching circuit in accordance with claim 1, wherein the single merged port includes an impedance matching circuit.

13. A multiplex antenna matching circuit in accordance with claim 1, wherein the antenna is a shared narrow band antenna.

14. A multiplex antenna matching circuit in accordance with claim 1, which is incorporated as part of a wireless communication device.

15. A multiplex antenna matching circuit in accordance with claim 1, wherein the wireless communication device is a radio frequency cellular telephone.

16. A method for coupling multiple signal ports to an antenna, the method comprising:
    coupling, via a diplexer, a single merged port associated with the antenna with two separated signal nodes, wherein coupling the single merged port associated with the antenna with the two separated signal nodes includes coupling each of the respective two separated signal nodes via a respective band pass filter, where the separated signal nodes include a higher signal node coupled to the single merged port via a band pass filter which is tuned for passing higher band signals, and where the separated signal nodes include a lower signal node coupled to the single merged port via a band pass filter which is tuned for passing lower band signals; and
    coupling, via each one of at least one cascaded sub-diplexer, a respective one of the two separated signal nodes with a respective two further separated signal ports.

17. A method in accordance with claim 16, wherein each of the two further separated signal ports and any one of the two separated signal nodes that is not associated with one of the at least one cascaded sub-diplexer is coupled to a respective signal source.

18. A method in accordance with claim 17, wherein each of the respective signal sources is a transceiver.

19. A wireless communication device comprising:
    an antenna;
    a diplexer for coupling a single merged port associated with the antenna with two separated signal nodes, wherein the diplexer couples the single merged port to each of the respective separated signal nodes via a band pass filter, where the separated signal nodes include a higher signal node coupled to the single merged port via a band pass filter which is tuned for passing higher band signals, and where the separated signal nodes include a lower signal node coupled to the single merged port via a band pass filter which is tuned for passing lower band signals;

at least one cascaded sub-diplexer, each cascaded sub-diplexer associated with a respective one of the of the two separated signal nodes, where the cascaded sub-diplexer further couples the respective one of the two separated signal nodes with two further separated signal ports; and a plurality of transceivers including a respective transceiver associated with each of the two further separated signal ports, and any of the two separated signal nodes that are not associated with the at least one cascaded sub-diplexer.

20. A multiplex antenna matching circuit in accordance with claim 7, wherein each of the further separated signal ports and any separated signal node, which is not associated with one of the cascaded sub-diplexers, is coupled to a respective transceiver.

* * * * *